(12) United States Patent
Shimada et al.

(10) Patent No.: US 6,334,410 B2
(45) Date of Patent: *Jan. 1, 2002

(54) EXHAUST HEAT RECOVERY BOILER

(75) Inventors: Hideaki Shimada; Norihide Egami; Takayuki Nagashima, all of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/727,581

(22) Filed: Dec. 4, 2000

Related U.S. Application Data

(62) Division of application No. 09/499,451, filed on Feb. 7, 2000, which is a division of application No. 09/167,714, filed on Oct. 7, 1998, now Pat. No. 6,050,226.

(30) Foreign Application Priority Data

Oct. 8, 1997 (JP) ............................................. 9-276203

(51) Int. Cl.[7] ................................................. F22D 1/00
(52) U.S. Cl. ........................ 122/7 R; 122/4 D; 422/172
(58) Field of Search ................................ 122/7 R, 4 D; 422/171, 172, 177

(56) References Cited

U.S. PATENT DOCUMENTS 5,293,842 A * 3/1994 Koesel ........................ 122/7 R
5,660,799 A * 8/1997 Motai et al. ................. 122/7 R
5,997,822 A * 12/1999 Komai et al. ................ 422/172

* cited by examiner

Primary Examiner—Jiping Lu
(74) Attorney, Agent, or Firm—Oblon, Spivak, McClelland, Maier & Neustadt, P.C.

(57) ABSTRACT

An exhaust heat recovery boiler in which an exhaust gas discharged from a gas turbine into a boiler duct to recover a heat of the exhaust gas and ammonia is injected to and mixed with the exhaust gas to reduce nitrogen oxide contained in the exhaust gas, the exhaust heat recovery boiler comprising: a boiler duct of a horizontal installation type having an inner hollow portion along which an exhaust gas flows from an upstream side to a downstream side; a superheater; an evaporator; a denitration reactor; and an economizer, which are disposed inside the boiler duct in this order from the upstream side to the downstream side of the exhaust gas flow therein. A drum is disposed outside the boiler duct and connected to the evaporator and a downcomer pipe extending from the drum into the boiler duct. An ammonia injection unit is disposed inside the boiler duct for injecting ammonia, and the ammonia injection unit is disposed upstream side of the evaporator closely to the downcomer pipe unit on either one of upstream side and downstream side of the downcomer pipe unit.

2 Claims, 14 Drawing Sheets

EXHAUST HEAT RECOVERY BOILER

This Appln. is a Div. of Ser. No. 09/499,451 filed Feb. 7, 2000 which is a Div. of Ser. No. 09/167,714 filed Oct. 7, 1998, U.S. Pat. No. 6,050,226.

BACKGROUND OF THE INVENTION

The present invention relates to an exhaust heat recovery boiler, particularly, capable of reducing and removing a nitrogen oxide (NOx) contained in an exhaust gas.

In recent years, in order to improve an efficiency of power generation in the light of energy conservation, in addition to power generation by a gas turbine, there is a tendency of employing a combined cycle power generation plant which recovers an exhaust heat of the exhaust gas of the gas turbine so as to generate a steam and performs power generation by a steam turbine with the use the generated steam. Further, in order to improve an efficiency of power generation and a power generation output, the combined cycle power generation plant tends to be further made into a large capacity.

In the combined cycle power generation plant, an exhaust heat recovery boiler is employed to recover an exhaust heat and to generate a steam. The exhaust heat recovery boiler recovers a heat of the exhaust gas discharged from, for example, a gas turbine or diesel engine, and then, generates and supplies a driving steam for a steam turbine and a process steam hot water. Further, taking environmental protection into consideration, the exhaust heat recovery boiler includes a denitrator for reducing a harmful nitrogen oxide contained in the exhaust gas. In particular, recently, there is a tendency of providing a high performance denitrator which can remove 90% or more of the nitrogen oxide contained in the exhaust gas, in the exhaust heat recovery boiler.

A conventional exhaust heat recovery boiler will be described hereunder with reference to FIG. 22 which is a side view schematically showing the exhaust heat recovery boiler, and FIG. 23 which is a top plan view of an ammonia injection section (unit) of the exhaust heat recovery boiler.

As shown in these figures, a horizontal natural circulation type exhaust heat recovery boiler is a reheat dual pressure type boiler, which is opertively connected to, for example, a gas turbine G, diesel engine, or the like. A boiler duct 14 is provided therein with heat transfer pipes of a high pressure secondary superheater 15, a reheater 16, a high pressure primary superheater 13, a high pressure evaporator 4, a low pressure superheater 17, a high pressure economizer 18, a low pressure evaporator 19 and a low pressure economizer 20, which are located successively in the described order in the boiler duct from the upstream side to the downstream side along an exhaust gas flow direction. Further, the boiler duct 14 is provided therein with an ammonia injection section 1 and an NOx removal reactor 5, and the upper portion of the boiler is provided with a high pressure drum 6 and a low pressure drum 21. A reference numeral 2 denotes an ammonia injection section support member, a reference numeral 3 denotes a high pressure drum downcomer pipe, a reference numeral 7 denotes an ammonia injection pipe, and a reference numeral 8 denotes an ammonia injection nozzle.

Further, it is to be noted that, in the above description, the some members or units are disposed to be adaptable for high and low pressures, but in an equipment having relatively small capacity, these members or units may be utilized as one member or unit, respectively.

Next, an operation of the aforesaid exhaust heat recovery boiler will be described hereunder.

An exhaust gas flowing into the exhaust heat recovery boiler successively passes through the high pressure secondary superheater 15, the reheater 16 and the high pressure primary superheater 13, and then, is mixed with ammonia in the ammonia injection section 1. Then, the exhaust gas passes through the high pressure evaporator 4, and thereafter, nitrogen oxide contained in the exhaust gas is removed by means of the NOx removal reactor (denitration reactor or denitrator) 5 including a catalyst layer facilitating a reduction reaction. Further, the exhaust gas successively passes through the low pressure superheater 17, the high pressure economizer 18, the low pressure evaporator 19 and the low pressure economizer 20, and then, is discharged to the atmospheric air.

The ammonia injection section 1 of the exhaust heat recovery boiler is arranged on an upstream side of the high pressure evaporator 4 with respect to the exhaust gas flow direction. Further, ammonia needs to be uniformly mixed with the exhaust gas, and for this reason, the ammonia injection section 1 is arranged at a position separated from the denitration reactor 5 to some degree in a manner that the high pressure evaporator 4 is interposed between the injection section 1 and the denitration reactor 5. When passing through the high pressure evaporator 4 having many heat transfer pipes regularly arranged, the ammonia and the exhaust gas are uniformly mixed. The ammonia is oxidized at a temperature of 490° C. or more, and then, a nitrogen oxide is generated. For this reason, it is not preferable to properly keep an NOx removal efficiency. Thus, a proper exhaust gas temperature is required, and then, in order to satisfy these conditions, the ammonia injection section 1 is arranged on a downstream side of the high pressure primary superheater 13 from the exhaust gas flow direction and on the upstream side of the high pressure evaporator 4, and a planned gas temperature is about 470° C. In this manner, in the exhaust heat recovery boiler, a harmful nitrogen oxide contained in the exhaust gas is removed while heat exchange being made by the heat transfer pipes.

FIG. 24 is a view showing the ammonia injection section of FIG. 22 in the case of viewing from the exhaust gas flow direction.

In FIG. 24, the ammonia injection section 1 includes an ammonia injection pipe(s) 7, an ammonia injection section support member(s) 2 and a number of ammonia injection nozzles 8 formed to the ammonia injection pipe 3. The ammonia is mixed with an air in a mixer 22, and then, passes through an ammonia injection section inlet connecting pipe 23, an ammonia injection section header 24 and an ammonia injection section inlet pipe 25, and thus, flows into an ammonia injection pipe 7 supported by the ammonia injection section support member 2. The ammonia flowing into the ammonia injection pipe 7 is injected from many ammonia injection nozzles 8 provided on the ammonia injection pipe 7, and then, is mixed with an exhaust gas. These many ammonia injection nozzles 8 are vertically alternately provided on the ammonia injection pipe 7 so that the ammonia is uniformly mixed with the exhaust gas. Further, the flow rate of ammonia is controlled by means of ammonia flow control valves 26 so that the ammonia is uniformly mixed with the exhaust gas. As described above, the ammonia injection section is constructed in a manner that ammonia is uniformly injected to the overall section of exhaust gas passage in the boiler duct.

As described above, the combined cycle power generation plant has a tendency of being made into a large capacity, and for this reason, the exhaust heat recovery boiler is also made into a large size. Thus, this is a factor of causing an increase in an installation space, cost and a unit price of power generation. In order to avoid the above disadvantage, there is a need of saving a space of the exhaust heat recovery boiler and making low cost design. The conventional exhaust heat recovery boiler has a problem of requiring a large space around the ammonia injection section and a drum downcomer pipe and increasing the entire length of the boiler.

Further, the combined cycle power generation plant is made into a large capacity, thus increasing the gas turbine power output while the exhaust gas temperature rising up. Accordingly, the exhaust heat recovery boiler has also a tendency of being made into high temperature and large capacity. For this reason, in the light of environmental conservation, it is obliged for the exhaust heat recovery boiler to include a high performance denitrator.

However, in the conventional exhaust heat recovery boiler, the exhaust gas temperature rises up, and also, the temperature of the ammonia injection section rises up depending upon a system for supplying a cooling steam to a gas turbine. For this reason, there is the possibility that ammonia injection is not performed at a proper temperature. In other words, there is a problem that it is difficult to realize high NOx removal efficiency in the exhaust heat recovery boiler which is made into a high temperature and large capacity.

SUMMARY OF THE INVENTION

An object of the present invention is to eliminate defects or drawbacks encountered in the prior art mentioned above and to provide an exhaust heat recovery boiler capable of saving and effectively utilizing an installation space for the exhaust heat recovery boiler by arranging an ammonia injection section to an optimal position and capable of effectively removing a nitrogen oxide contained in an exhaust gas in accordance with a high temperature and large capacity exhaust heat recovery boiler.

This and other objects can be achieved according to the present invention by providing, in one aspect, an exhaust heat recovery boiler in which an exhaust gas discharged from, for example, gas turbine, into a boiler duct to recover a heat of the exhaust gas and ammonia is injected to and mixed with the exhaust gas so as to reduce nitrogen oxide contained in the exhaust gas, the exhaust heat recovery boiler comprising:

a boiler duct of a horizontal installation type having an inner hollow portion along which an exhaust gas flows from an upstream side to a downstream side;

a superheater disposed inside the boiler duct at an upstream side of the exhaust gas flow;

an evaporator disposed downstream side of the superheater superheater;

a denitration reactor disposed downstream side of the evaporator;

an economizer disposed downstream side of the evaporator;

a drum disposed outside the boiler duct and connected to the evaporator;

a downcomer pipe unit extending from the drum into the boiler duct; and an ammonia injection unit disposed inside the boiler duct for injecting ammonia, the ammonia injection unit being disposed upstream side of the evaporator closely to the downcomer pipe unit on either one of upstream side and downstream side of the downcomer pipe unit.

In another aspect, there is provided an exhaust heat recovery boiler in which an exhaust gas discharged from, for example, a gas turbine, into a boiler duct to recover a heat of the exhaust gas and ammonia is injected to and mixed with the exhaust gas so as to reduce nitrogen oxide contained in the exhaust gas, the exhaust heat recovery boiler comprising:

a boiler duct of a horizontal installation type having an inner hollow portion along which an exhaust gas flows from an upstream side to a downstream side;

a superheater disposed inside the boiler duct at an upstream side of the exhaust gas flow;

an evaporator unit disposed downstream side of the superheater, the evaporator unit including a primary evaporator and a secondary evaporator disposed downstream side of the primary evaporator;

a denitration reactor disposed downstream side of the evaporator unit;

an economizer disposed downstream side of the evaporator unit;

a drum disposed outside the boiler duct and connected to the evaporator unit;

a downcomer pipe unit extending from the drum into the boiler duct; and an ammonia injection unit disposed inside the boiler duct for injecting ammonia, the ammonia injection unit and the downcomer pipe unit being disposed between the primary and secondary evaporators, the ammonia injection unit being arranged closely to the downcomer pipe on either one of upstream side and downstream side of the downcomer pipe unit.

In a further aspect, there is provided an exhaust heat recovery boiler in which an exhaust gas discharged from, for example, a gas turbine, into a boiler duct to recover a heat of the exhaust gas and ammonia is injected to and mixed with the exhaust gas so as to reduce nitrogen oxide contained in the exhaust gas, the exhaust heat recovery boiler comprising:

a boiler duct of a horizontal installation type having an inner hollow portion along which an exhaust gas flows from an upstream side to a downstream side;

a superheater disposed inside the boiler duct at an upstream side of the exhaust gas flow;

an evaporator disposed downstream side of the superheater;

a denitration reactor disposed downstream side of the evaporator;

an economizer disposed downstream side of the evaporator;

a drum disposed outside the boiler duct and connected to the evaporator;

a downcomer pipe unit extending from the drum into the boiler duct; and an ammonia injection unit disposed inside the boiler duct for injecting ammonia, the evaporator being composed of a plurality of heat transfer tubes which are arranged in parallel to each other, the ammonia injection unit being arranged in parallel to the heat transfer pipes and being supported at upper and lower ends thereof by means of upper and lower headers.

In a still further aspect, there is provided an exhaust heat recovery boiler in which an exhaust gas discharged from, for example, a gas turbine, into a boiler duct to recover a heat of the exhaust gas and ammonia is injected to and mixed with the exhaust gas so as to reduce nitrogen oxide contained in the exhaust gas, the exhaust heat recovery boiler comprising:
- a boiler duct of a horizontal installation type having an inner hollow portion along which an exhaust gas flows from an upstream side to a downstream side;
- a superheater disposed inside the boiler duct at an upstream side of the exhaust gas flow;
- an evaporator disposed downstream side of the superheater;
- a denitration reactor disposed downstream side of the evaporator;
- an economizer disposed downstream side of the evaporator;
- a drum disposed outside the boiler duct and connected to the evaporator;
- a downcomer pipe unit extending from the drum into the boiler duct; and
- an ammonia injection unit disposed inside the boiler duct for injecting ammonia,
- the ammonia injection unit being disposed upstream side of the evaporator and arranged between the downcomer pipe unit and the superheater and the ammonia injection unit being supported at upper and lower ends thereof by means of upper and lower headers.

In preferred embodiments of the above various aspect, the ammonia injection unit is disposed on the upstream side or downstream side of the downcomer pipe unit.

The ammonia injection unit includes a plurality of ammonia injection pipes, a plurality of ammonia injection pipe supporting members and a number of ammonia injection nozzles, and the downcomer pipe unit includes a plurality of downcomer pipes, the ammonia injection pipe supporting members being disposed in parallel to the downcomer pipes with respect to the exhaust gas flow. The ammonia injection nozzles are formed to two ammonia injection pipes, which are arranged in the same level with respect to the exhaust gas flow, the injection nozzles being formed in a manner that injection nozzles formed to one ammonia injection pipe and injection nozzles formed to another one ammonia injection pipe are arranged alternately with respect to the exhaust gas flow direction.

The ammonia injection pipe supporting members are arranged between adjacent downcomer pipes, respectively. The ammonia injection pipe supporting members may be mounted to the downcomer pipes. The downcomer unit may commonly serve as the ammonia injection pipe supporting members.

The evaporator unit is composed of a plurality of heat transfer tubes arranged in parallel to each other.

According to the characters and structures of the exhaust heat recovery boiler of the present invention mentioned above, the ammonia injection unit (section) is arranged at the same position as the drum downcomer pipe unit when viewing from the exhaust heat recovery boiler. Thus, a dimension is reduced in the exhaust gas flow direction of the exhaust heat recovery boiler, and therefore, there can be provided a compact exhaust heat recovery boiler which can save a space with low cost design. Further, the ammonia injection section is supported by the downcomer pipe, so that the above effects will be enhanced.

Furthermore, the evaporator may be divided, and the ammonia injection unit and the boiler downcomer pipe unit are interposed between the divided evaporators. Thus, even if the exhaust gas temperature rises up due to a rise of the combustion temperature of the prime mover, heat exchange is made up to a proper temperature, and thereafter, ammonia is injected, and then, it is possible to remove a nitrogen oxide. Therefore, space saving is achieved in the exhaust heat recovery boiler, and the exhaust heat recovery boiler is provided at a low cost. Further, a nitrogen oxide can be sufficiently removed in a high temperature and large capacity exhaust heat recovery boiler as compared with the conventional arrangement, and it is possible to sufficiently take measures for environmental protection in the high temperature and large capacity exhaust heat recovery boiler.

Still furthermore, since no downcomer pipe is arranged on the pipe group outlet of the vaporizer, the mixed gas smoothly flows into the denitrator, and the catalyst is effectively acted. Therefore, it is possible to improve the NOx removal efficiency even with the same quantity of catalyst as compared with the conventional case.

The nature and further characteristic features of the present invention will be made more clear from the following descriptions of preferred embodiments made with reference to the accompanying drawings.

DESCRIPTION OF THE PREFERRED EMBODIMENTS

Figure 1:
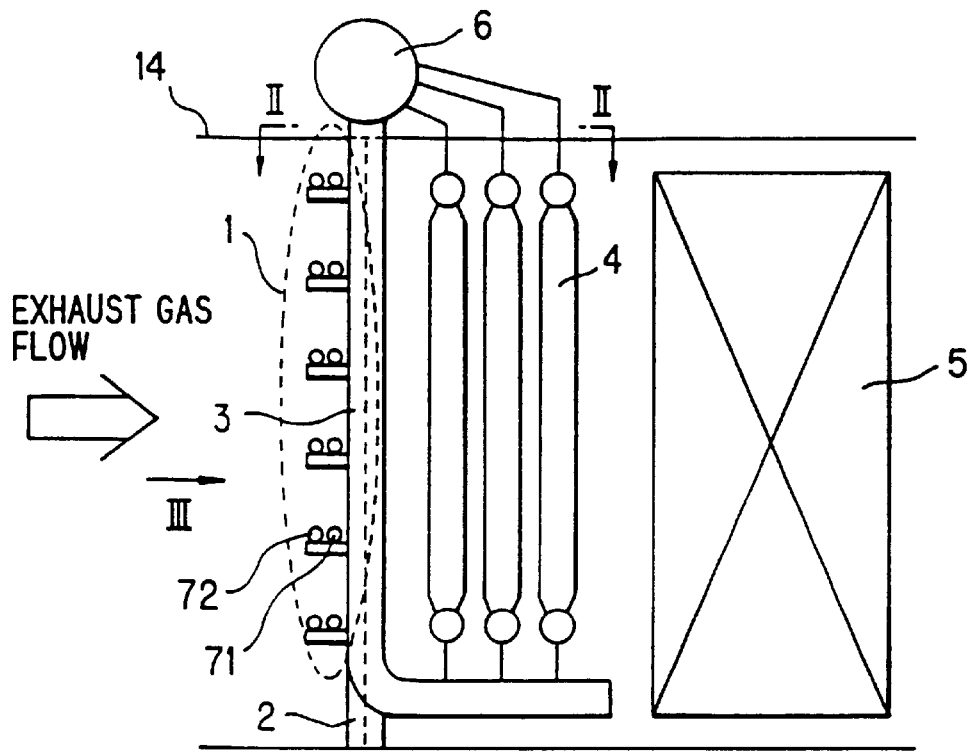
FIG. 1 is a side view showing an ammonia injection section (unit) according to a first embodiment of the present invention.

Embodiments of the present invention will be described below with reference to FIGS. 1 to 21 of the accompanying drawings, in which like reference numerals are added to units or members corresponding to those shown in FIG. 22 and the detailed description of the common members are omitted herein, and that is, hereunder, only the essential portions of the exhaust heat recovery boiler of the present invention are mentioned for the sake of convenience.

Figure 2:
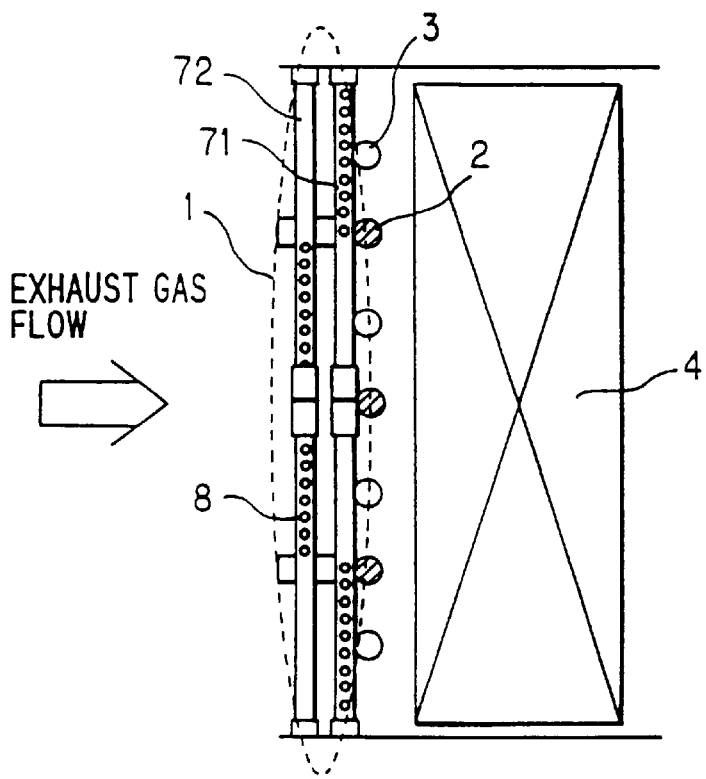
FIG. 2 is a top plan view of the ammonia injection section as viewed from an arrow II—II in FIG. 1.
Figure 3:
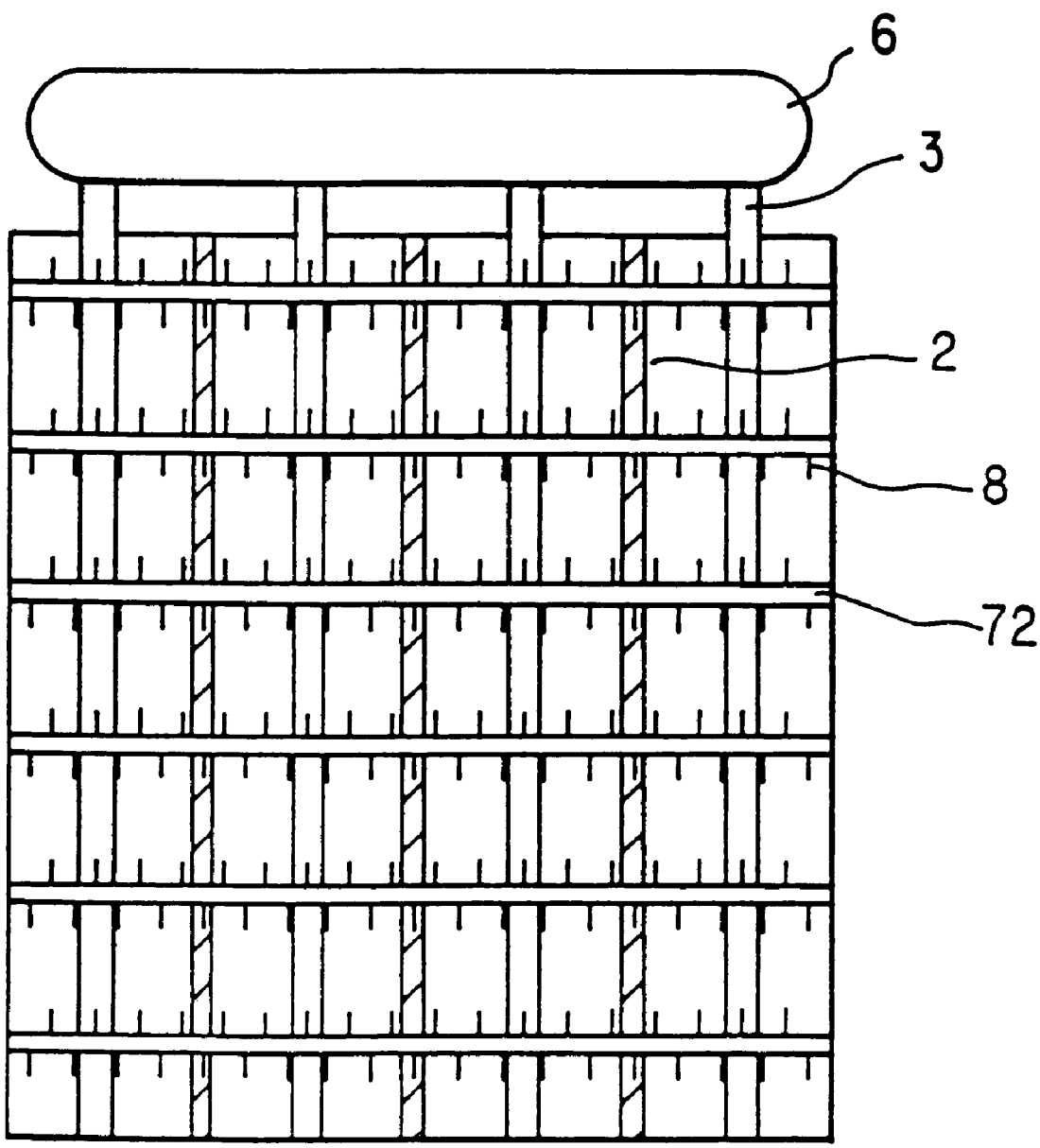
FIG. 3 is a view showing the ammonia injection section shown in FIG. 1 or FIG. 11 viewing it from an exhaust gas flow direction (arrow III)

FIGS. 1 to 3 are views showing an ammonia injection section according to a first embodiment of the present invention.

As shown in these figures, in this first embodiment, the ammonia injection section (unit) 1 is arranged on an upstream side of a high pressure evaporator 4 with respect to the exhaust gas flow direction in the boiler duct 14 and at the same position as a high pressure drum downcomer pipe of a high pressure drum 6, and usually, a plurality of downcomer pipes are arranged so as to extend in parallel to each other. Further, the high pressure drum downcomer pipe 3 and an ammonia injection section support member 2 are arranged in parallel to the boiler horizontal direction, normal to the exhaust gas flow direction in the boiler duct. The ammonia injection section 1 includes plural pairs of ammonia injection pipes 71, 72, each pair including two pipes arranged side by side, a plurality of ammonia injection pipe support members 2 and a number of ammonia injection nozzles formed to the respective ammonia injection pipes. The two ammonia injection pipes 71 and 72 are arranged in parallel to each other in the exhaust gas flow direction. The ammonia injection nozzles 8 are alternately provided on each of the ammonia injection pipes 71 and 72 in the exhaust gas flow direction. Thus, an exhaust gas is mixed with ammonia in the ammonia injection section 1, and then, passes through the high pressure evaporator 4, and thereafter, a nitrogen oxide is removed by means of an NOx removal reactor 5 which functions as a denitration reactor or denitrator.

According to this embodiment, the ammonia injection section 1 is arranged on an upstream side of a high pressure evaporator 4 with respect to the exhaust gas flow direction in the boiler duct 14 and at the same position as a high pressure drum downcomer pipe 3 of a high pressure drum 6. Thus, it is possible to save a space in the exhaust gas flow direction. Further, the exhaust gas flows from the ammonia injection section 1 into the denitration reactor 5 via the high pressure evaporator 4, which is composed of a plurality of heat transfer pipes arranged in parallel to each other, so that a nitrogen oxide can be removed in a state that ammonia and exhaust gas are uniformly mixed with each other. Furthermore, a mixed gas smoothly flows into the denitration reactor 5 because no high pressure drum downcomer pipe 3 is provided on a pipe group outlet of the high pressure evaporator 4, and therefore, catalyst is effectively activated, so that the NOx removal efficiency can be improved even the same quantity of catalyst as compared with the conventional case.

Figure 4:
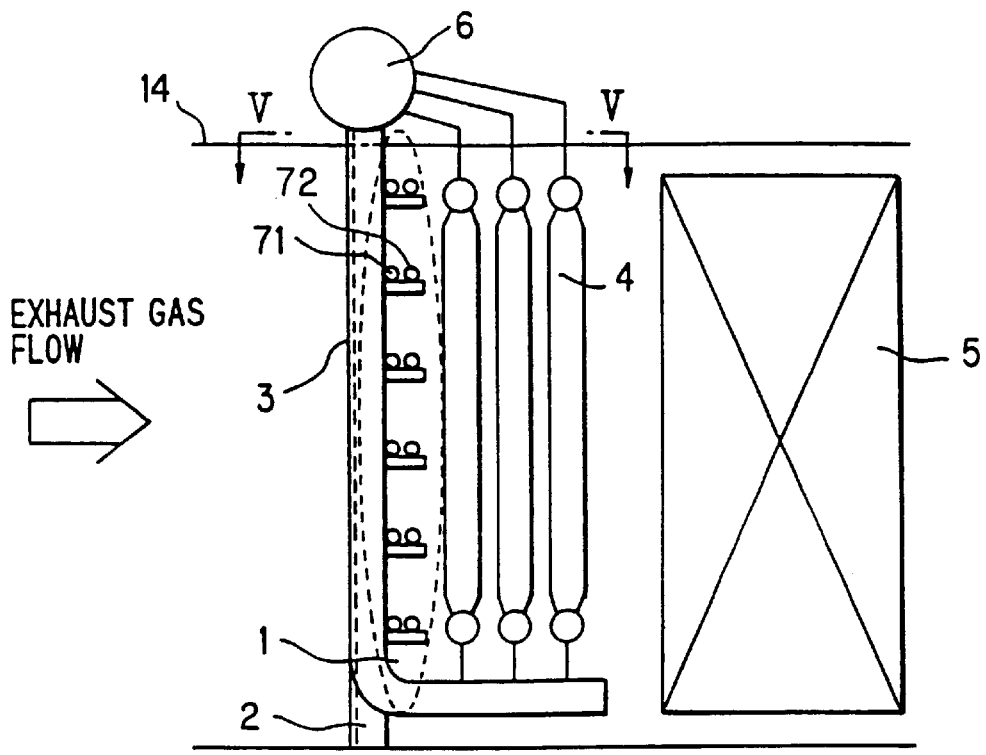
FIG. 4 is a side view showing an ammonia injection section according to a modified embodiment of the first embodiment of the present invention.
Figure 5:
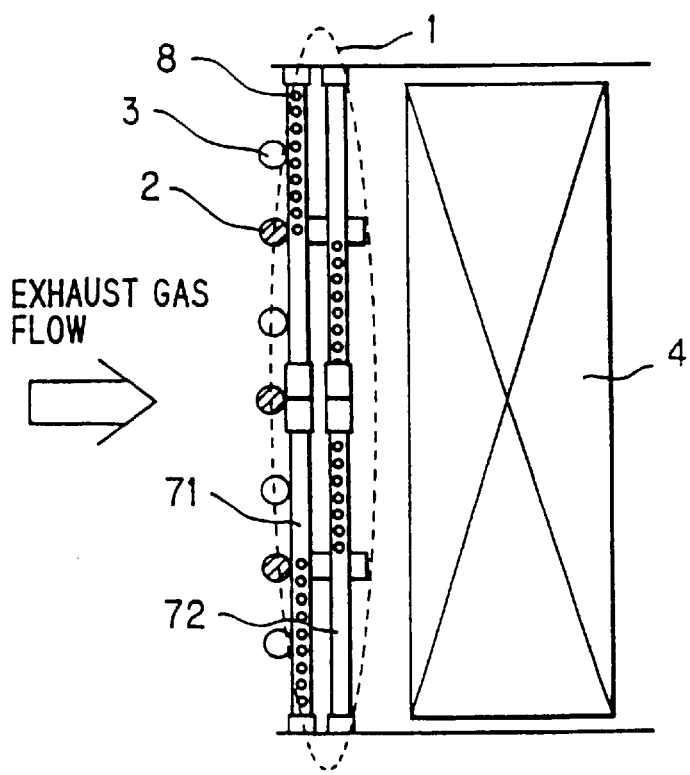
FIG. 5 is a top plan view showing the ammonia injection section as viewed from an arrow V—V in FIG. 4.

FIGS. 4 and 5 are views showing an ammonia injection section according to a modified embodiment of the first embodiment of the present invention.

As shown in these figures, this embodiment differs from the first embodiment in that the ammonia injection pipes 71 and 72 and the ammonia injection nozzle 8 are arranged on a down stream side of the high pressure drum downcomer pipe 3 with respect to the exhaust gas flow direction in the boiler duct 14, and other construction is substantially the same as that of the first embodiment. Thus, like reference numerals are used to designate the same components or units as those of the first embodiment, and the overlapping explanation is omitted.

According to this embodiment, the ammonia injection section 1 and the high pressure drum downcomer pipe 3 are arranged at the same position when viewing the side of the exhaust heat recovery boiler. Thus, it is possible to save a space in the exhaust gas flow direction. Further, the exhaust gas flows from the ammonia injection section 1 into the denitration reactor 5 via the high pressure evaporator 4, so that a nitrogen oxide can be removed in a state that ammonia and exhaust gas are uniformly mixed with each other. Furthermore, the mixed gas smoothly flows into the denitration removal reactor 5 because no high pressure drum downcomer pipe 3 is provided on a pipe group outlet of the high pressure evaporator 4, and therefore, catalyst is effectively activated, so that the NOx removal efficiency can be improved even the same quantity of catalyst as compared with the conventional case.

Figure 6:
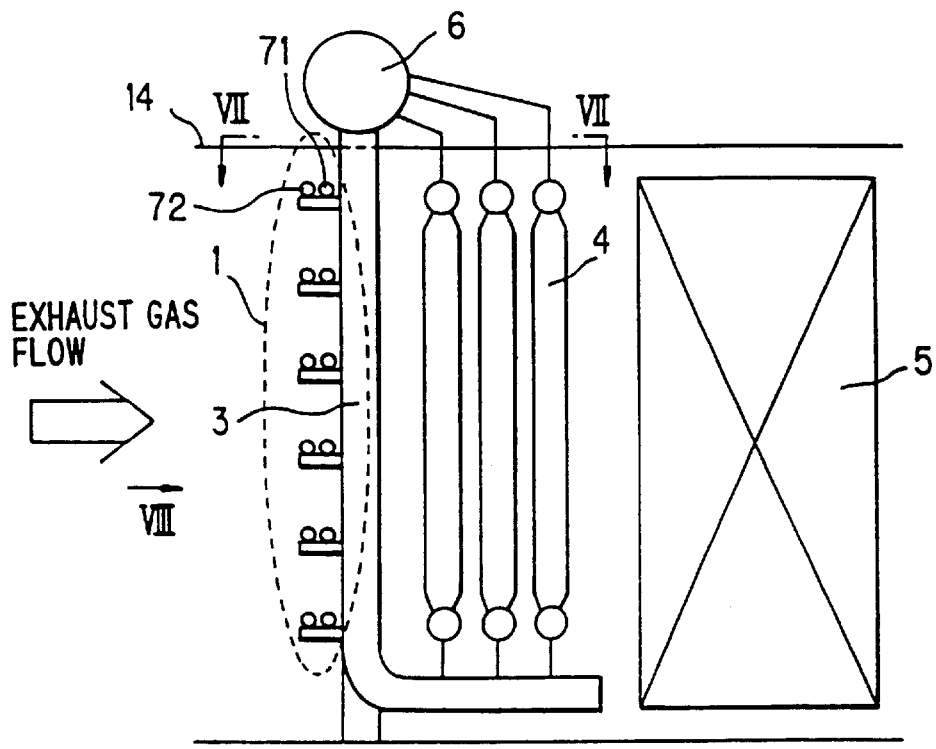
FIG. 6 is a side view showing an ammonia injection section according to a second embodiment of the present invention.
Figure 7:
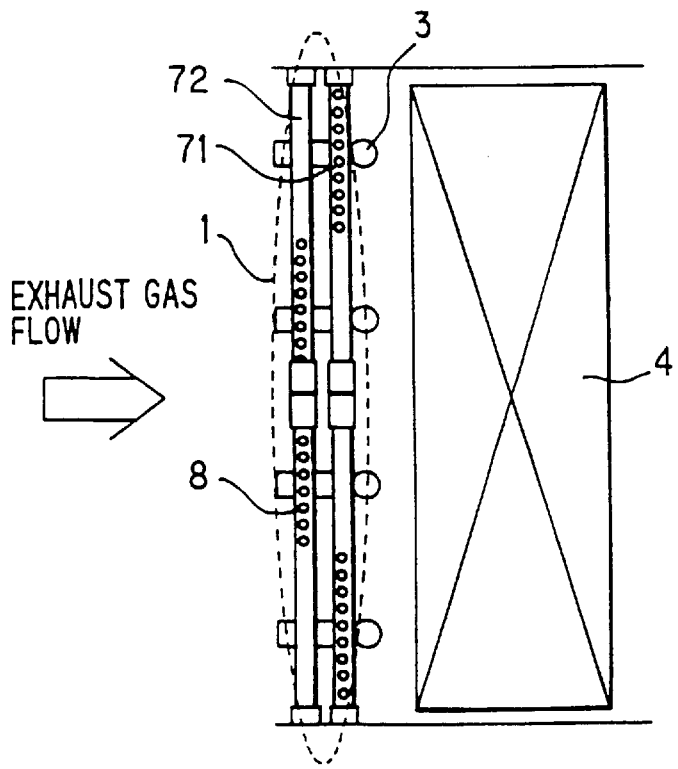
FIG. 7 is a top plan view of the ammonia injection section as viewed from an arrow VII—VII in FIG. 6.
Figure 8:
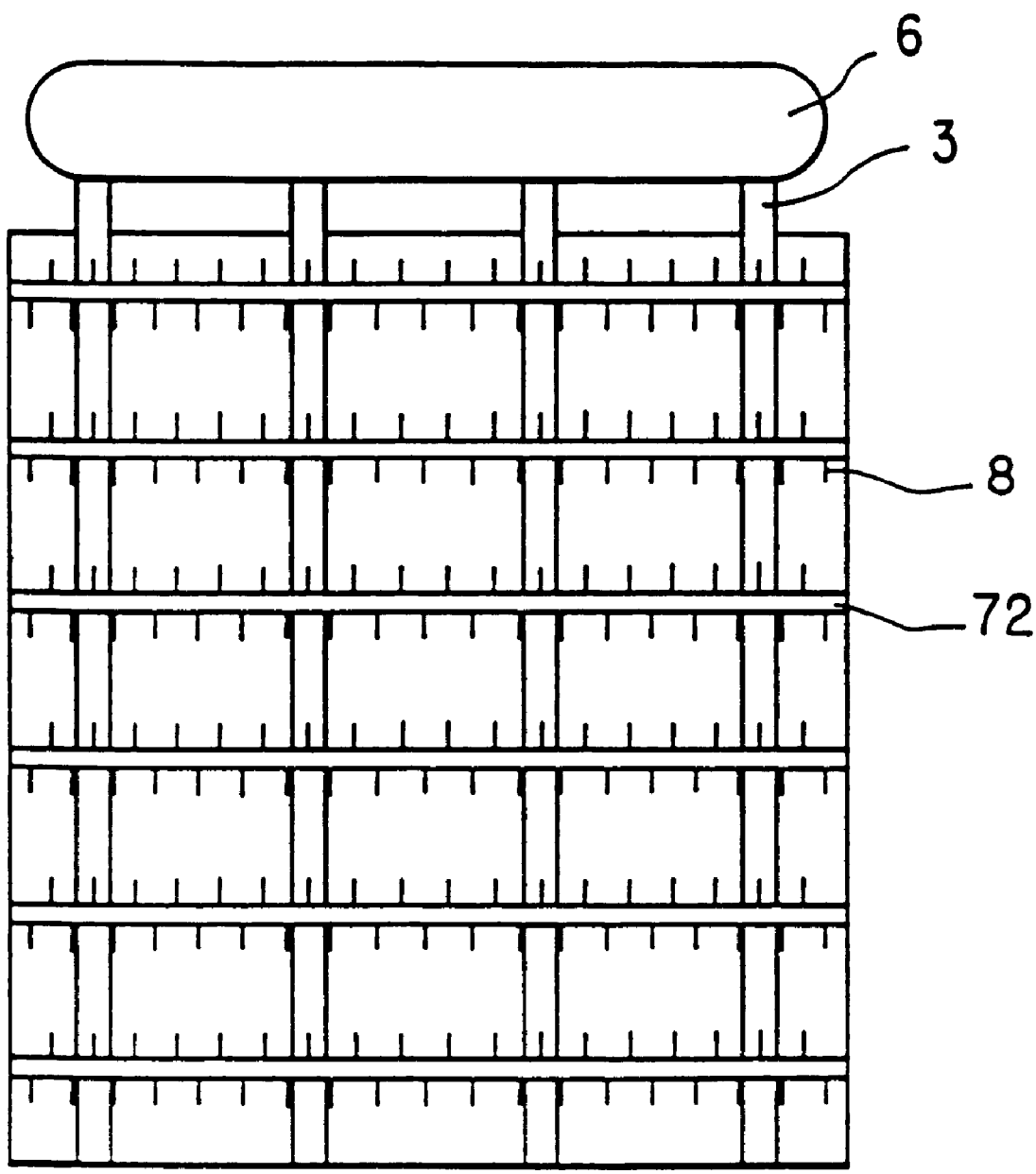
FIG. 8 is a view showing the ammonia injection section shown in FIG. 6 viewing it from an exhaust gas flow direction (arrow VIII)

FIGS. 6 to 8 are views showing an ammonia injection section according to a second embodiment of the present invention.

As shown in these figures, this second embodiment differs from the first embodiment in that the high pressure drum downcomer pipe 3 functions as the ammonia injection section support member 2 in order to eliminate the ammonia injection section support member, and other construction is the same as that of the first embodiment. Thus, like reference numerals are used to designate the same components as those of the first embodiment, and the overlapping explanation is omitted.

In this second embodiment, like the first embodiment, the exhaust gas is mixed with ammonia in the ammonia injection section 1, and then, passes through the high pressure evaporator 4, and thereafter, a nitrogen oxide is removed by means of the denitration reactor 5. Further, the high pressure drum downcomer pipe 3 functions as the ammonia injection section support member 2, so that the ammonia injection section support member is dispensed. Therefore, the number of components can be reduced.

Figure 9:
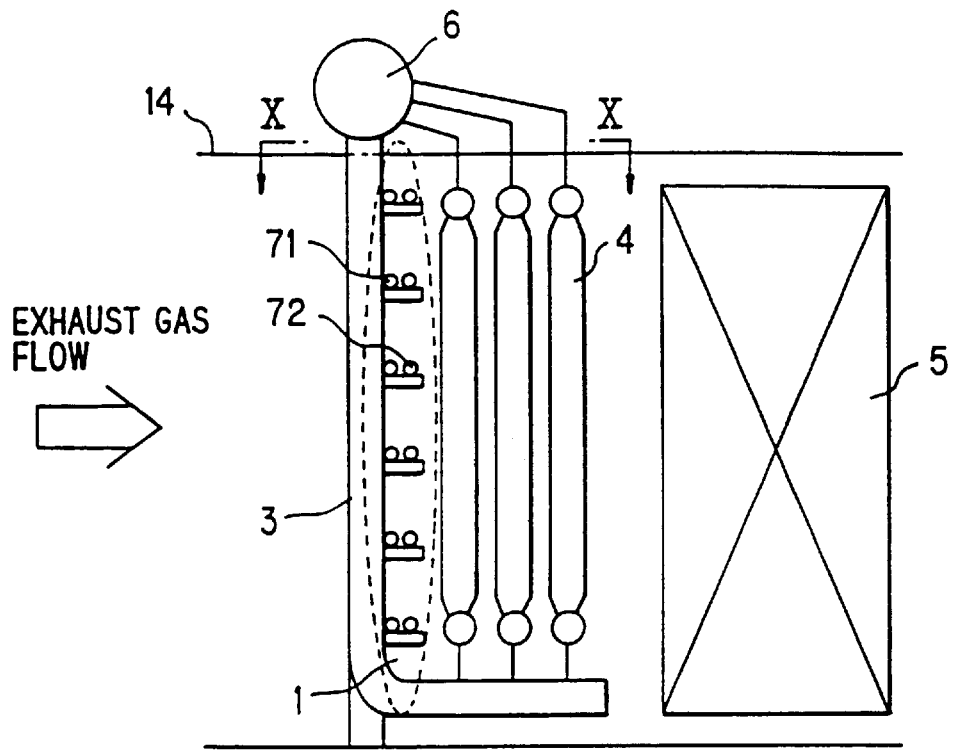
FIG. 9 is a side view showing an ammonia injection section according to a modified embodiment of the second embodiment of the present invention.
Figure 10:
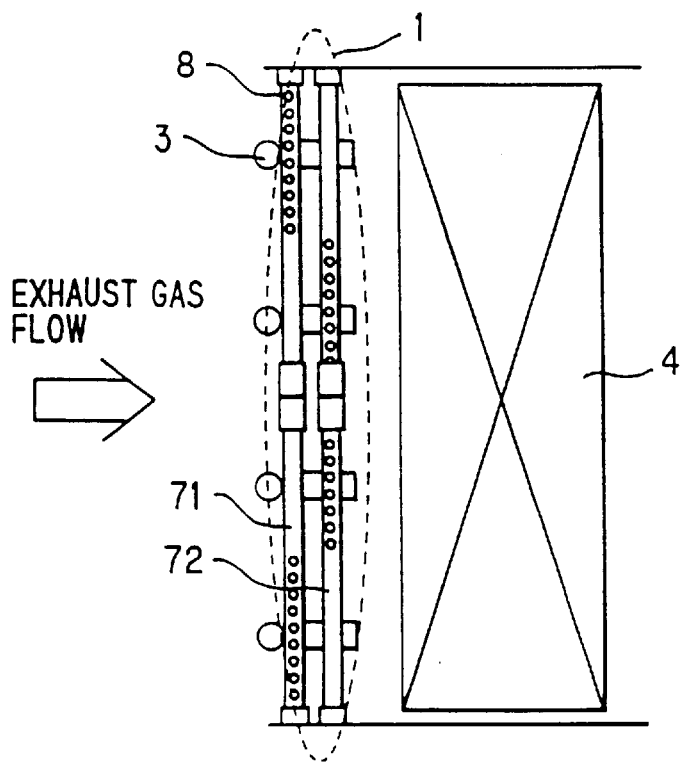
FIG. 10 is a top plan view showing the ammonia injection section as viewed from an arrow X—X in FIG. 9.

FIGS. 9 and 10 are views showing an ammonia injection section according to a modified embodiment of the second embodiment of the present invention.

As shown in these figures, this embodiment differs from the second embodiment in that the ammonia injection pipes 71 and 72 and the ammonia injection nozzle 8 are arranged on a down stream side of the high pressure drum downcomer pipe 3 with respect to the exhaust gas flow direction in the boiler duct 14, and other construction is the same as that of the first embodiment. Thus, like reference numerals are used to designate the same components as those of the first embodiment, and the overlapping explanation is omitted.

According to this embodiment, the ammonia injection section 1 and the high pressure drum downcomer pipe 3 are arranged at the same position when viewing the side of the exhaust heat recovery boiler. Thus, it is possible to save a space in the exhaust gas flow direction. Further, the exhaust gas flows from the ammonia injection section 1 into the denitration reactor 5 via the high pressure evaporator 4, so that a nitrogen oxide can be removed in a state that ammonia and exhaust gas are uniformly mixed with each other. Furthermore, the mixed gas smoothly flows into the denitration reactor 5 because no high pressure drum downcomer pipe 3 is provided on a pipe group outlet of the high pressure evaporator 4, and therefore, catalyst is effectively activated, so that the NOx removal efficiency can be improved even with the same quantity of catalyst as compared with the conventional case.

Figure 11:
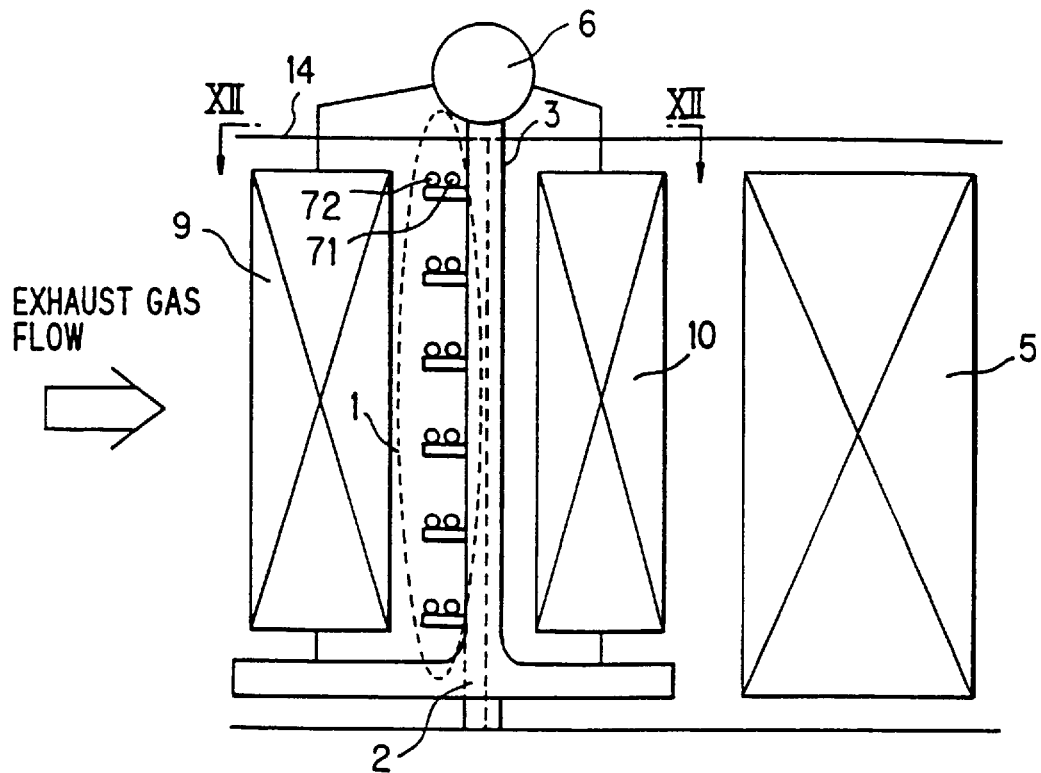
FIG. 11 is a side view showing an ammonia injection section according to a third embodiment of the present invention.
Figure 12:
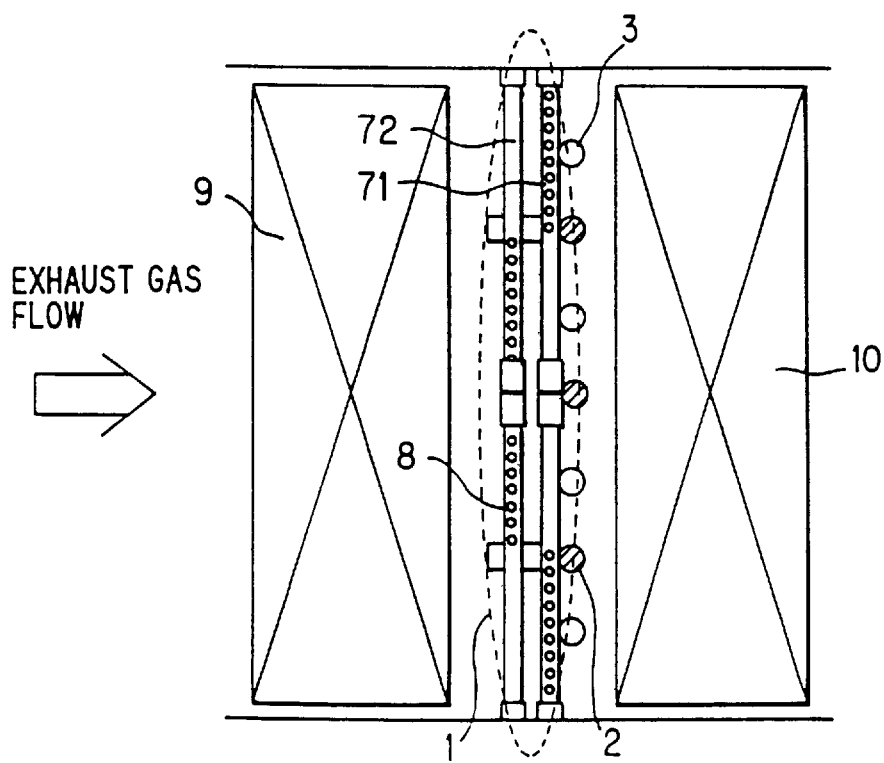
FIG. 12 is a top plan view showing the ammonia injection section as viewed from an arrow XII—XII in FIG. 11.

FIGS. 11 and 12 are views showing an ammonia injection section according to a third embodiment of the present invention.

As shown in these figures, this third embodiment differs from the first embodiment in that the high pressure evaporator 4 is divided into a first high pressure evaporator section 9 and a second high pressure evaporator section 10 and that the ammonia injection section 1 and the high pressure drum downcomer pipe 3 are interposed between these first and second high pressure evaporator sections 9 and 10, and other construction is the same as that of the first embodiment. Thus, like reference numerals are used to designate the same components as those of the first embodiment, and the overlapping explanation is omitted.

In this third embodiment, the ammonia injection section 1 and the high pressure drum downcomer pipe 3 are arranged at the same position when view the side of the exhaust heat recovery boiler, like the first and second embodiments. Further, the high pressure drum downcomer pipe 3 and the ammonia injection section support member 2 are arranged in parallel in the horizontal direction, like the first embodiment. The exhaust gas passes through the first high pressure evaporator section 9, and then, is mixed with ammonia in the ammonia injection section 1. Further, the exhaust gas passes through the second high pressure evaporator section 10, and thereafter, a nitrogen oxide is removed by means of the denitration reactor 5. Therefore, according to this third embodiment, it is possible to improve the NOx removal efficiency as compared with the conventional case.

Figure 13:
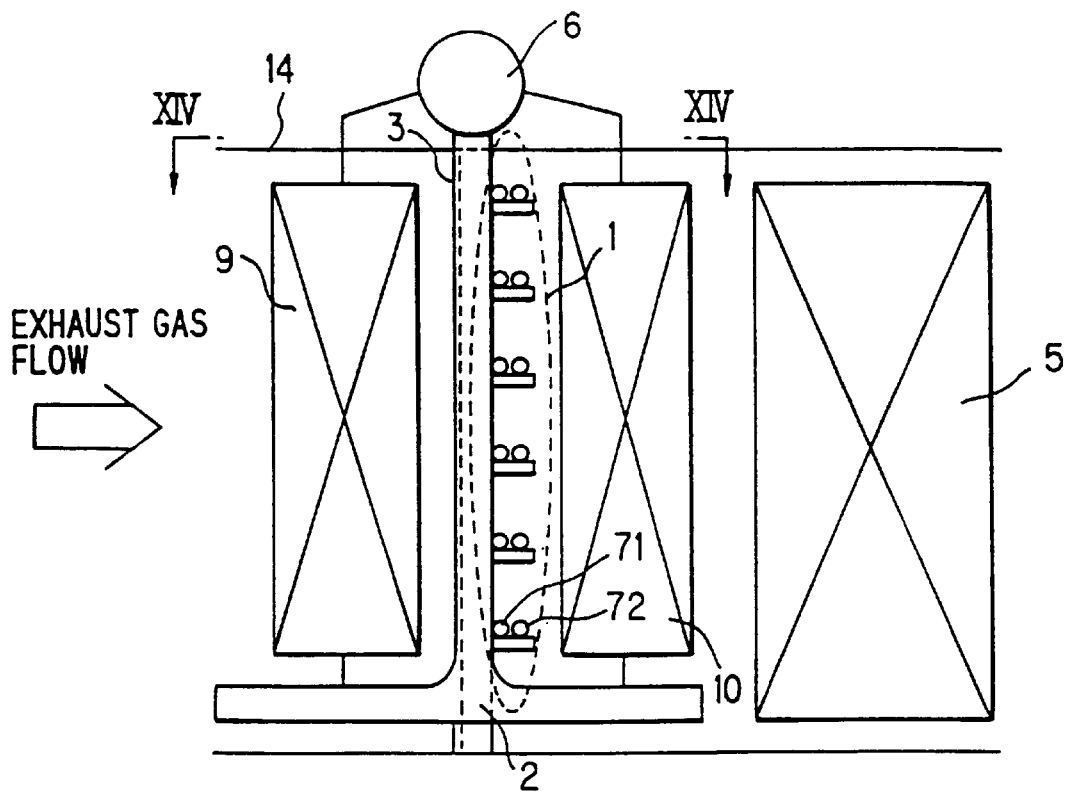
FIG. 13 is a side view showing an ammonia injection section according to a modified embodiment of the third embodiment of the present invention.
Figure 14:
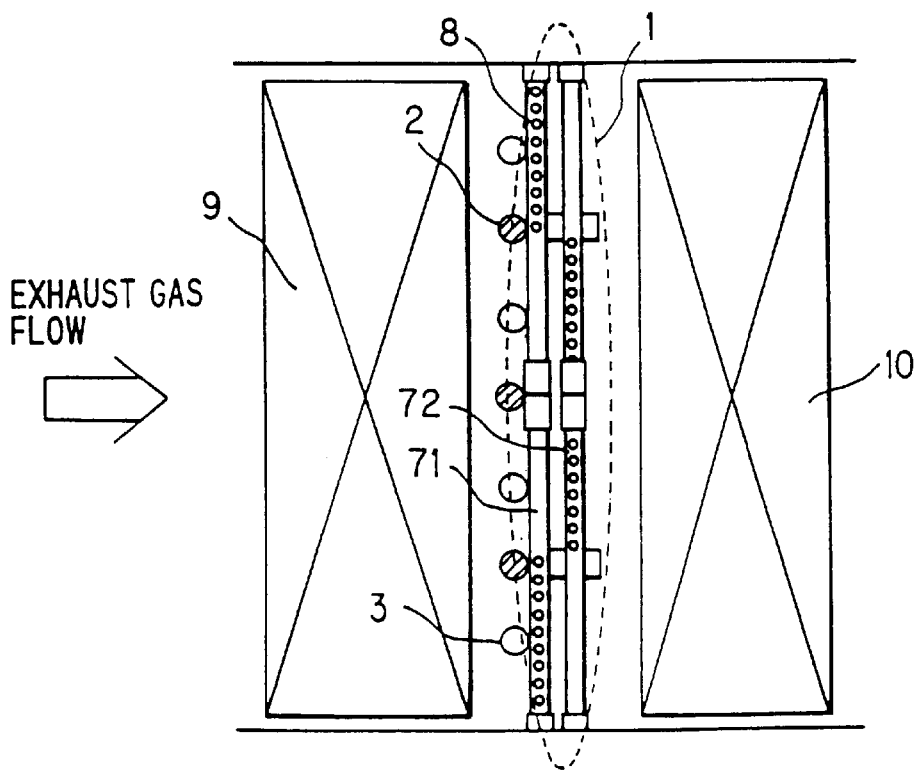
FIG. 14 is a top plan view showing the ammonia injection section as viewed from an arrow XIV—XIV in FIG. 13.

FIGS. 13 and 14 are views showing an ammonia injection section according to a modified embodiment of the third embodiment of the present invention.

As shown in these figures, this embodiment differs from the third embodiment in that the ammonia injection pipes 71 and 72 and the ammonia injection nozzles 8 are arranged on a down stream side of the high pressure drum downcomer pipe 3 with respect to the exhaust gas flow direction in the boiler duct 14, and other construction is the same as that of the first embodiment. Thus, like reference numerals are used to designate the same components as those of the first embodiment, and the overlapping explanation is omitted.

According to this embodiment, as the ammonia injection pipes 71, 72 and the ammonia injection are arranged on a downstream side of the high pressure drum downcomer pipe 3 with respect to the exhaust gas flow direction, in addition to reduction in space, in the exhaust gas flow direction, of the exhaust heat recovery boiler, the exhaust gas passes more heat transfer pipe groups than the conventional one before it reaches the ammonia injection section 1 so that the exhaust gas reaches the ammonia injection section 1 after the heat exchanges are performed many times.

Further, since the temperature difference between the inlet of the exhaust heat recovery boiler and the ammonia injection section 1 becomes large, if the temperature of the exhaust gas at the inlet of the exhaust heat recovery boiler is higher than the conventional one, the temperature of the exhaust gas is reduced up to a proper temperature so that the exhaust gas can be guided into the ammonia injection section 1. Accordingly, it is possible to increase the exhaust heat recovery efficiency and denitration efficiency.

Figure 15:
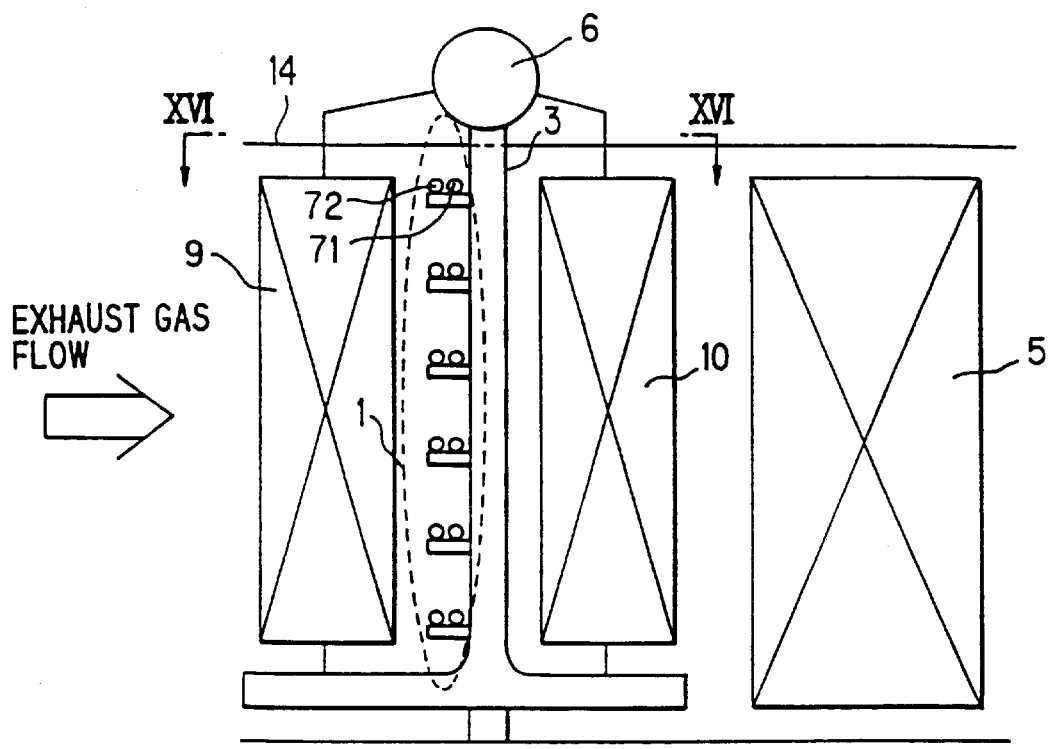
FIG. 15 is a side view showing an ammonia injection section according to a fourth embodiment of the present invention.
Figure 16:
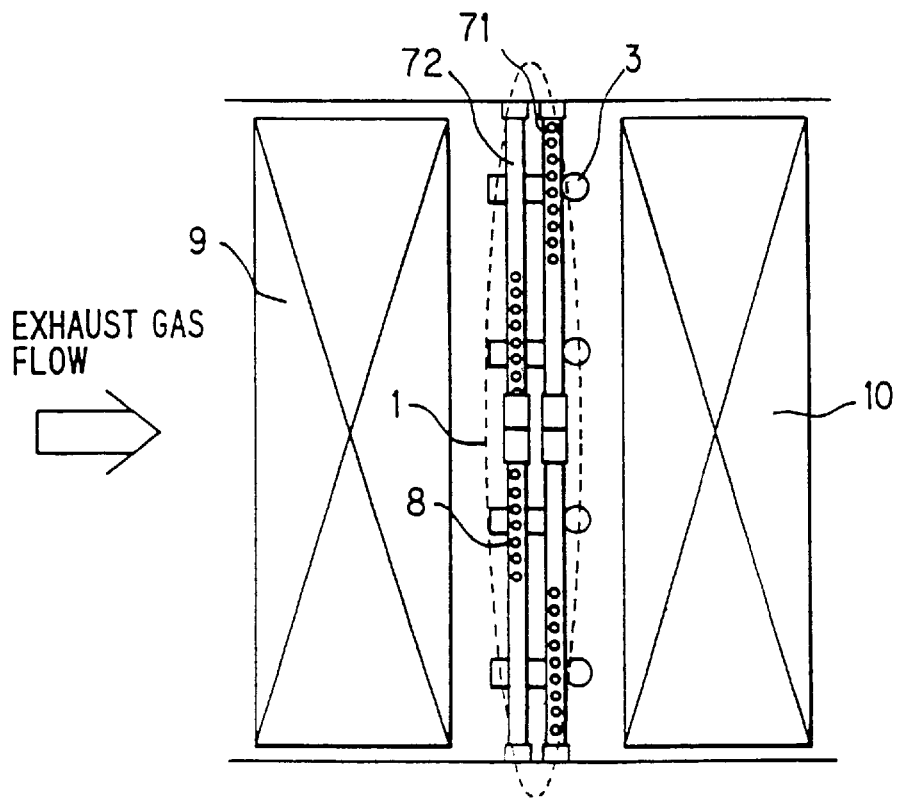
FIG. 16 is a top plan view showing the ammonia injection section as viewed from an arrow XVI—XVI in FIG. 15.

FIGS. 15 and 16 are views showing an ammonia injection section according to a fourth embodiment of the present invention.

As shown in these figures, this fourth embodiment differs from the third embodiment in that the high pressure drum downcomer pipe 3 also functions as the ammonia injection section support member 2 in order to eliminate the ammonia injection section support member, and other construction is the same as that of the first embodiment. Thus, like reference numerals are used to designate the same components as those of the first embodiment, and the overlapping explanation is omitted.

In this fourth embodiment, like the third embodiment, the exhaust gas is mixed with ammonia in the ammonia injection section 1, and then, passes through the high pressure evaporator 4, and thereafter, a nitrogen oxide is removed by means of the denitration reactor 5. Further, the high pressure drum downcomer pipe 3 also functions as the ammonia injection section support member 2, so that the ammonia injection section support member is dispensed. Therefore, the number of components can be reduced.

Figure 17:
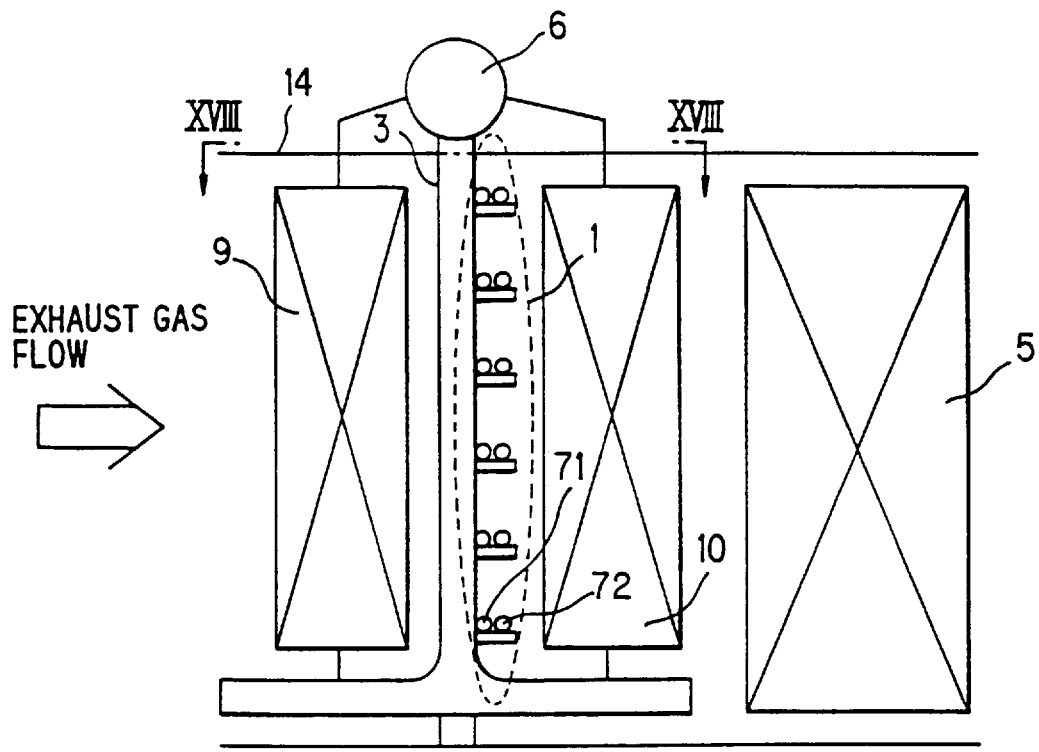
FIG. 17 is a side view showing an ammonia injection section according to a modified embodiment of the fourth embodiment of the present invention.
Figure 18:
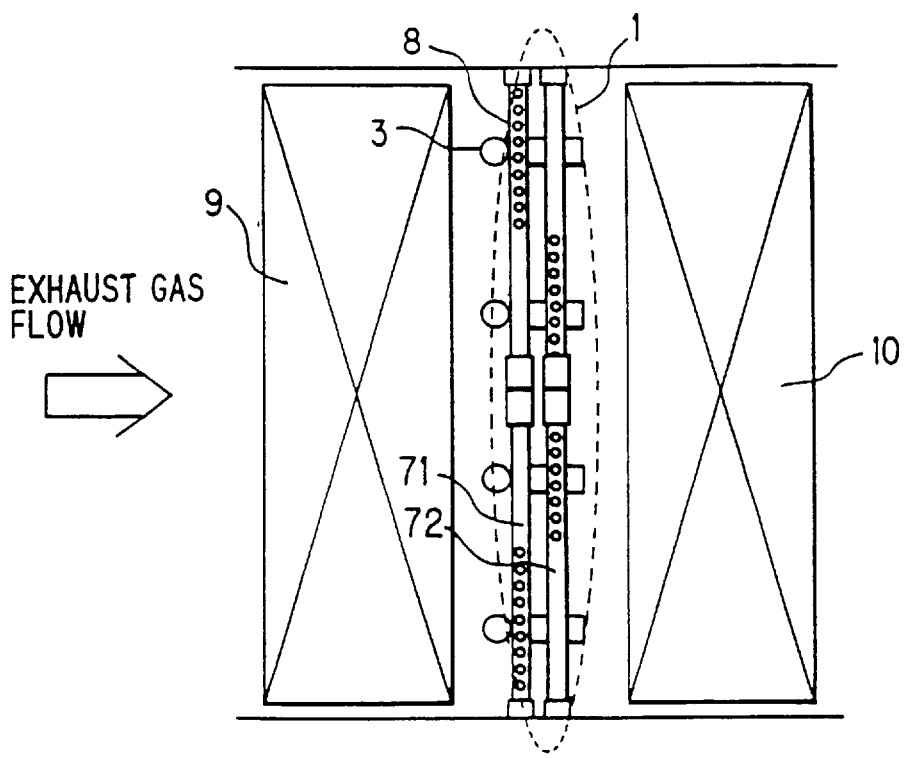
FIG. 18 is a top plan view showing the ammonia injection section as viewed from an arrow XVIII—XVIII in FIG. 17.

FIGS. 17 and 18 are views showing an ammonia injection section according to a modified embodiment of the fourth embodiment of the present invention.

As shown in these figures, this embodiment differs from the fourth embodiment in that the ammonia injection pipes 71 and 72 and the ammonia injection nozzles 8 are arranged on a down stream side of the high pressure drum downcomer pipe 3 with respect to the exhaust gas flow direction in the boiler duct 14, and other construction is the same as that of the first embodiment. Thus, like reference numerals are used to designate the same components as those of the first embodiment, and the overlapping explanation is omitted.

According to this embodiment, like the third embodiment, it is possible to improve an exhaust heat recovery and an NOx removal efficiency, and further, the support member is dispensed, so that the number of components can be reduced.

Figure 19:
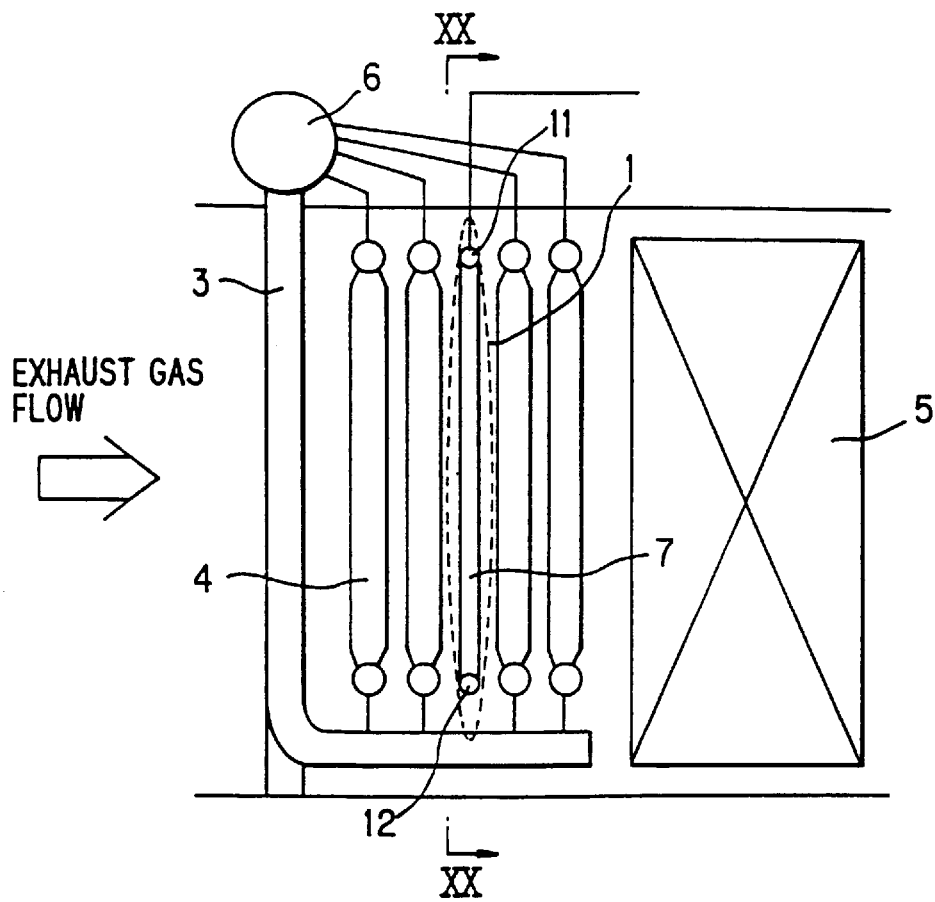
FIG. 19 is a side view showing an ammonia injection section according to a fifth embodiment of the present invention.
Figure 20:
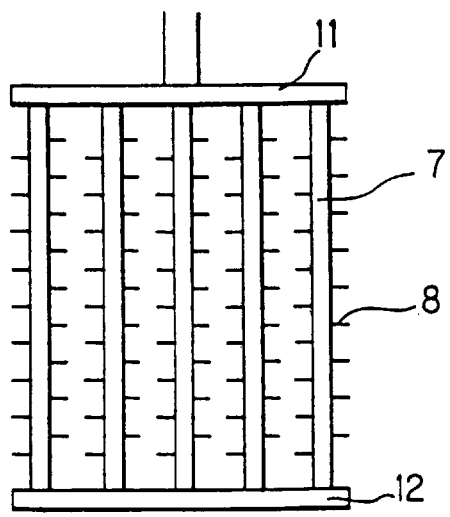
FIG. 20 is a view showing the ammonia injection section shown in FIG. 19 viewing it from an exhaust gas flow direction (arrow XX)

FIGS. 19 and 20 are views showing an ammonia injection section according to a fifth embodiment of the present invention.

As shown in these figures, in this fifth embodiment, the ammonia injection section 1 is constructed in a manner that the ammonia injection pipe 7 is connected with the use of an upper pipe header 11 and a lower pipe header 12. Further, the ammonia injection section 1 is inserted from the vertical direction, and is arranged on an intermediate portion of the high pressure evaporator 4 which is composed of a plurality of heat transfer pipes as mentioned before.

According to this fifth embodiment, in the ammonia injection section 1, upper and lower pipe headers 11 and 12 are used as like a heat transfer pipe, so that the ammonia injection section can be located from the vertical direction. Further, like the third and fourth embodiments, a space in the exhaust gas flow direction is saved, and it is possible to perform ammonia injection at a proper exhaust gas temperature.

Figure 21:
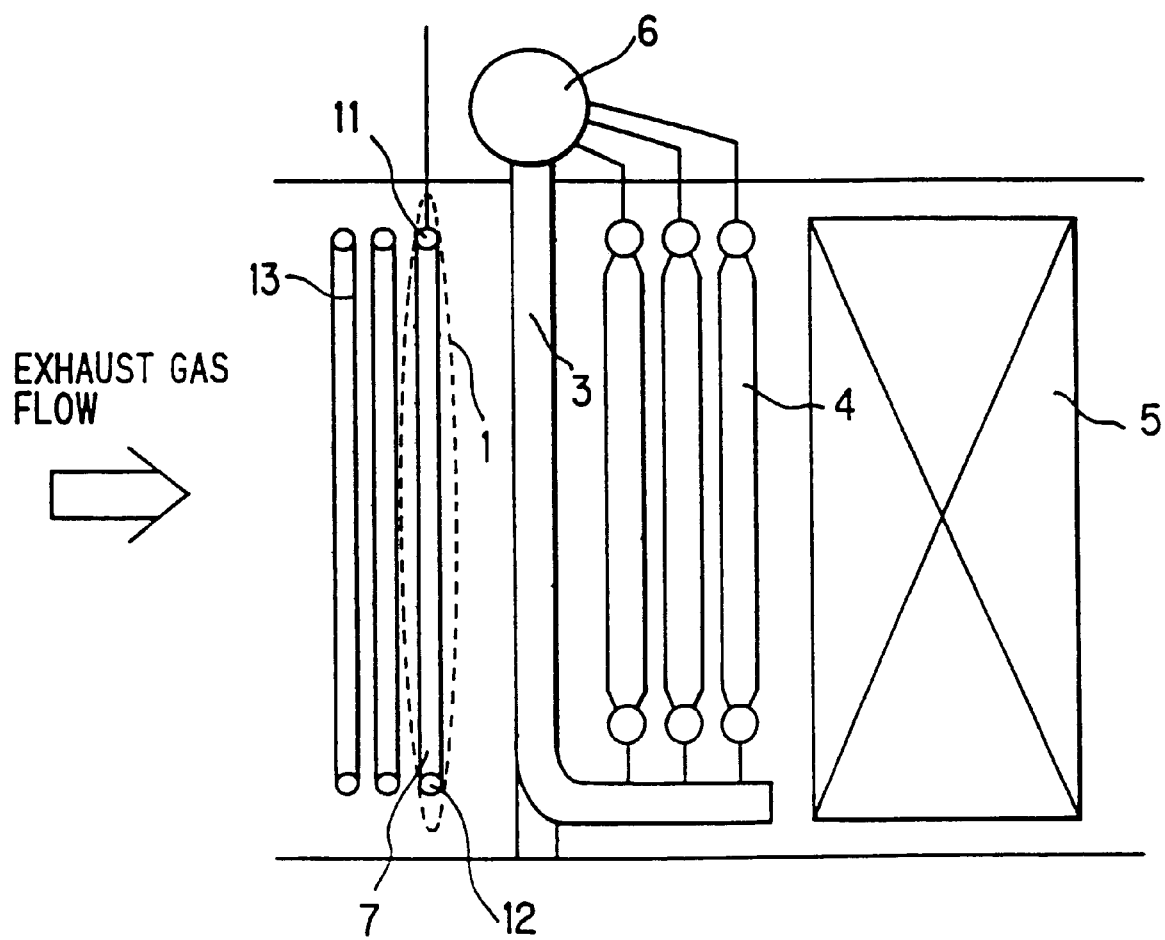
FIG. 21 is a side view showing an ammonia injection section according to a sixth embodiment of the present invention.
Figure 22:
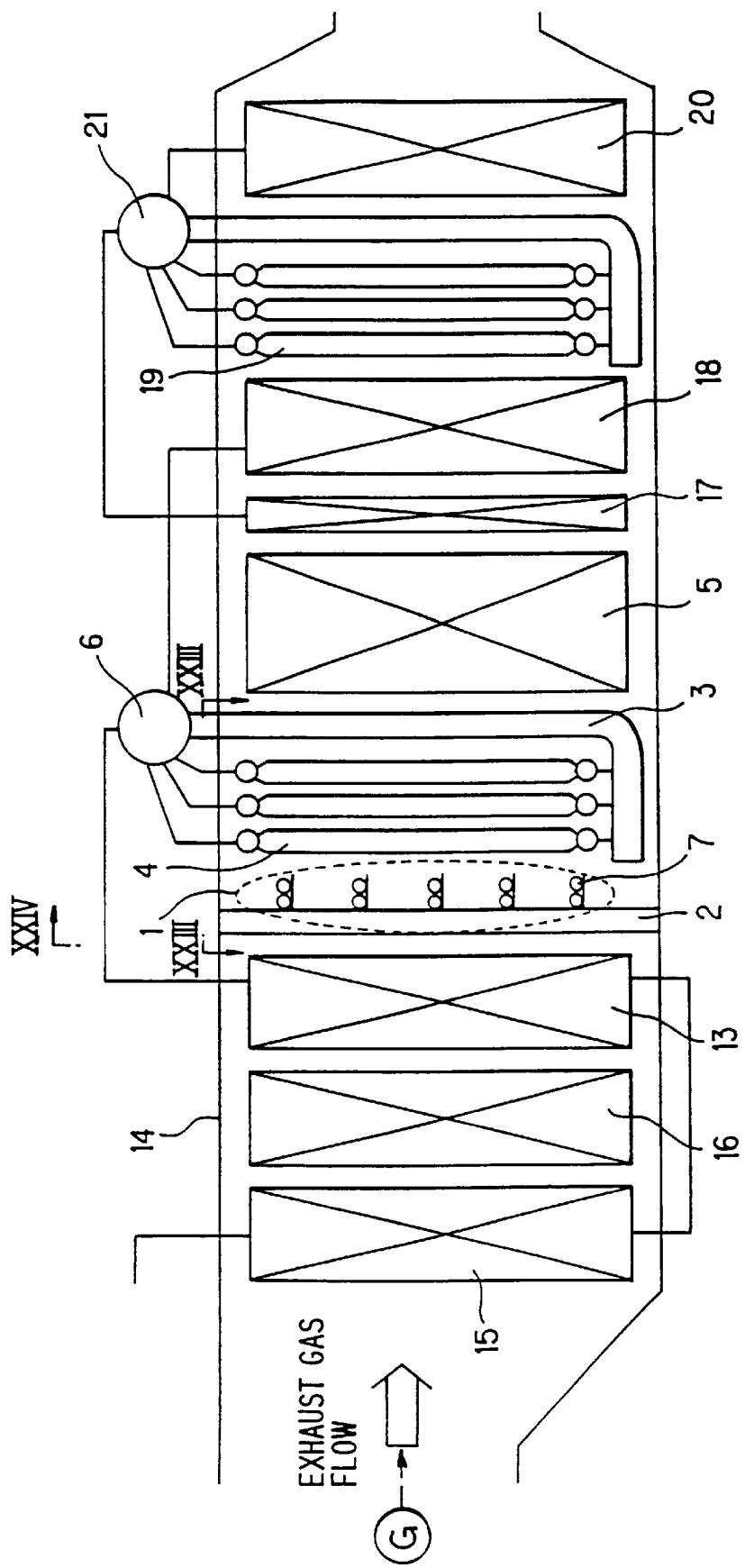
FIG. 22 is a side view schematically showing a conventional exhaust heat recovery boiler.
Figure 23:
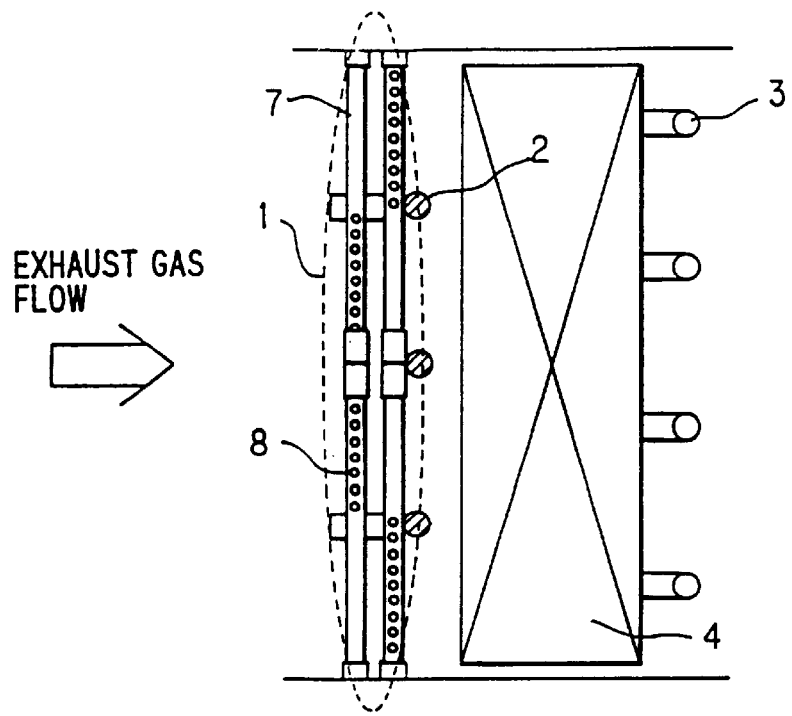
FIG. 23 is a top plan view showing an ammonia injection section as viewed from an arrow XXIII—XXIII in FIG. 22.
Figure 24:
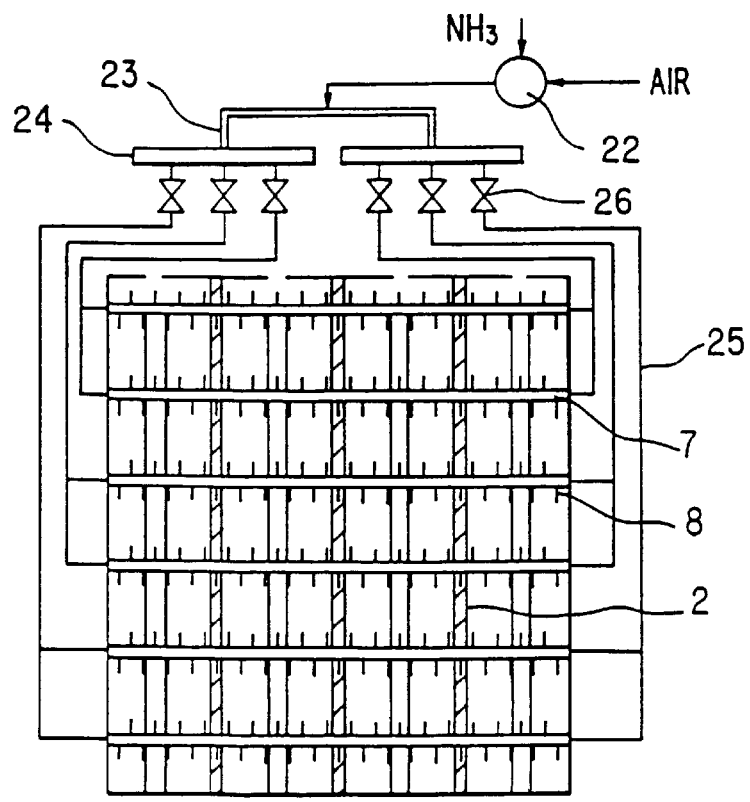
FIG. 24 is a view showing the ammonia injection section of the exhaust heat recovery boiler shown in FIG. 23 viewing it from an exhaust gas flow direction (arrow XXIV).

FIG. 21 is a view showing an ammonia injection section according to a sixth embodiment of the present invention.

As shown in FIG. 21, like the fifth embodiment, the ammonia injection section 1 is constructed in a manner that the ammonia injection pipe 7 is connected with the use of an upper pipe header 11 and a lower pipe header 12. Further, the ammonia injection section 1 is inserted from the vertical direction and is arranged on the downstream side of the high pressure primary superheater 13 with respect to the exhaust gas flow direction. Further, the ammonia injection pipe 7 and the ammonia injection nozzle 8 have the same arrangement as that of the fifth embodiment of FIG. 20.

According to this sixth embodiment, like the fifth embodiment, the ammonia injection section 1 is constructed with the use of upper and lower pipe headers 11 and 12. Therefore, a space in the exhaust gas flow direction is saved, and it is possible to perform ammonia injection at a proper exhaust gas temperature.

Further, it is to be noted that the present invention is not limited to the described embodiment and many other changes, modifications and combinations may be made without departing from the scopes of the appended claims.

For example, in the aforementioned various embodiments, although some units or members, such as superheater, evaporator, drum, downcomer and economizer, are utilized for high and low pressures, in the case of an equipment of relatively small capacity, only one unit or member may be utilized, respectively. That is, in the described embodiments, the units or members for low pressure may be eliminated.

What is claimed is:

1. An exhaust heat recovery boiler in which an exhaust gas is discharged into a boiler duct to recover a heat of the exhaust gas and ammonia is injected to and mixed with the exhaust gas so as to reduce nitrogen oxide contained in the exhaust gas, said exhaust heat recovery boiler comprising:
   a boiler duct of a horizontal installation type having an inner hollow portion along which an exhaust gas flows from an upstream side to a downstream side;
   a superheater disposed inside the boiler duct at an upstream side of the exhaust gas flow;
   an evaporator disposed downstream side of the superheater;
   a denitration reactor disposed downstream side of the evaporator;
   an economizer disposed downstream side of the evaporator;
   a drum disposed outside the boiler duct and connected to the evaporator;
   a downcomer pipe unit extending from the drum to an upstream side of the evaporator inside the boiler duct; and
   an ammonia injection unit disposed inside the boiler duct at an intermediate portion in the evaporator for injecting ammonia;
   said evaporator being composed of a plurality of heat transfer tubes which are arranged in parallel to each other, said ammonia injection unit being arranged to be parallel to said heat transfer tubes and being supported at upper and lower ends thereof by means of upper and lower headers.

2. An exhaust heat recovery boiler in which an exhaust gas is discharged into a boiler duct to recover a heat of the exhaust gas and ammonia is injected to and mixed with the exhaust gas so as to reduce nitrogen oxide contained in the exhaust gas, said exhaust heat recovery boiler comprising:
   a boiler duct of a horizontal installation type having an inner hollow portion along which an exhaust gas flows from an upstream side to a downstream side;
   a superheater disposed inside the boiler duct at an upstream side of the exhaust gas flow;
   an evaporator disposed downstream side of the superheater;
   a denitration reactor disposed downstream side of the evaporator;
   an economizer disposed downstream side of the evaporator;
   a drum disposed outside the boiler duct and connected to the evaporator;
   a downcomer pipe unit extending from the drum to an upstream side of the evaporator inside the boiler duct; and
   an ammonia injection unit disposed inside the boiler duct to a downstream side of the superheater for injecting ammonia,
   said ammonia injection unit being disposed upstream side of said evaporator and arranged between said downcomer pipe unit and said superheater, and said ammonia injection unit being supported at upper and lower ends thereof by means of upper and lower headers.

* * * * *